(12) United States Patent
Dai et al.

(10) Patent No.: US 9,256,366 B2
(45) Date of Patent: Feb. 9, 2016

(54) SYSTEMS AND METHODS FOR TOUCH-BASED TWO-STAGE TEXT INPUT

(75) Inventors: Hui Dai, Northbrook, IL (US);
Chang-Ki Jeong, Seoul (KR);
Chang-Hwan Kim, Kyyoung-gi do (KR); Jeong J. Ma, Long Grove, IL (US); Phillip D. Rasky, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 92 days.

(21) Appl. No.: 13/584,966

(22) Filed: Aug. 14, 2012

(65) Prior Publication Data
US 2014/0049477 A1 Feb. 20, 2014

(51) Int. Cl.
G06F 3/041 (2006.01)
G06F 3/0488 (2013.01)

(52) U.S. Cl.
CPC .................................. *G06F 3/04886* (2013.01)

(58) Field of Classification Search
None
See application file for complete search history.

(56) References Cited

U.S. PATENT DOCUMENTS

| | | | |
|---|---|---|---|
| 5,812,117 A | 9/1998 | Moon | |
| 5,956,021 A * | 9/1999 | Kubota et al. | 345/179 |
| 6,169,538 B1 * | 1/2001 | Nowlan et al. | 345/168 |
| 6,310,634 B1 | 10/2001 | Bodnar et al. | |
| 7,190,351 B1 * | 3/2007 | Goren | 345/173 |
| 7,336,263 B2 | 2/2008 | Valikangas | |
| 7,760,187 B2 | 7/2010 | Kennedy | |
| 8,117,540 B2 | 2/2012 | Assadollahi | |
| 2003/0179185 A1 | 9/2003 | Iwamura et al. | |
| 2003/0193478 A1 | 10/2003 | Ng et al. | |
| 2004/0070567 A1 | 4/2004 | Longe et al. | |
| 2005/0270270 A1 | 12/2005 | Chadha | |
| 2006/0217144 A1 | 9/2006 | Bonnelykke Kristensen et al. | |
| 2007/0046641 A1 | 3/2007 | Lim | |

(Continued)

FOREIGN PATENT DOCUMENTS

| | | |
|---|---|---|
| EP | 2395415 A2 | 12/2011 |
| WO | 03098417 A2 | 11/2003 |
| WO | 2007047188 A2 | 4/2007 |

OTHER PUBLICATIONS

Patent Cooperation Treaty, "PCT Search Report and Written Opinion of the International Searching Authority" for International Application No. PCT/US2013/054660 (CS39354), Dec. 5, 2013, 8 pages.

(Continued)

*Primary Examiner* — Joseph Haley
*Assistant Examiner* — Ifedayo Iluyomade
(74) *Attorney, Agent, or Firm* — Shumaker & Sieffert, P.A.

(57) ABSTRACT

Embodiments relate to systems and methods for touch-based two-stage text input. An electronic device (102), such as a wearable wireless device, can be configured with a two-stage input interface (116) on a display (104). A first stage can include a seek area (120), which displays a subset of letters or other symbols to represent the full range of symbolic elements that are available, in a compressed form. The user can identify an intended target range (128) by touching an area at or around the letter or other symbol of interest. That input triggers the display of a second stage of the interface in a separate selection area (122), in which all letters or other symbols in the target range are expanded and displayed. The user can then touch and lift off the letter or other symbol they wish to choose, for example, to insert in a message or application.

21 Claims, 9 Drawing Sheets

(56) References Cited

U.S. PATENT DOCUMENTS

| | | | |
|---|---|---|---|
| 2007/0262956 A1 | 11/2007 | Chen | |
| 2008/0174570 A1* | 7/2008 | Jobs et al. | 345/173 |
| 2009/0040184 A9 | 2/2009 | Pu et al. | |
| 2009/0058823 A1* | 3/2009 | Kocienda | 345/173 |
| 2010/0026650 A1 | 2/2010 | Srivastava et al. | |
| 2010/0066764 A1* | 3/2010 | Refai | 345/660 |
| 2010/0225599 A1 | 9/2010 | Danielsson et al. | |
| 2011/0185306 A1 | 7/2011 | Aravamudan | |
| 2011/0246943 A1 | 10/2011 | Fujibayashi | |
| 2011/0304555 A1 | 12/2011 | Murphy | |
| 2011/0320978 A1 | 12/2011 | Horodezky et al. | |
| 2012/0019540 A1 | 1/2012 | Yaksick et al. | |
| 2012/0081305 A1 | 4/2012 | Schrock | |
| 2013/0246329 A1 | 9/2013 | Pasquero et al. | |
| 2014/0015753 A1 | 1/2014 | Pai | |

OTHER PUBLICATIONS

Mark D. Dunlop and Michelle Montgomery Masters, "Investigating five key predictive text entry with combined distance and keystroke modelling", http://dl.acm.org/citation.cfm?id=1416968&bnc=1, Aug. 10, 2007, pp. 1-21.

I. Scott MacKenzie et al., "LetterWise: Prefix-based Disambiguation for Mobile Text Input", http://dl.acm.org/citation.cfm?id=502365&bnc=1, 14th Annual ACM Symposium on User Interface Software and Tech., Nov. 2001, pp. 111-120.

Jun Gong et al., "An Enhanced Multitap Text Entry Method with Predictive Next-Letter Highlighting", http://dl.acm.org/citation.cfm?id=1056926&bnc=1, Conference on Human Factors in Computing Systems, Apr. 2005, pp. 1399-1402.

Wikipedia, "Predictive Text", http://en.wikipedia.org/wiki/Predictive_text, printed Nov. 19, 2012, 1 page.

Asela Gunawardana, "Usability Guided Key-Target Resizing for Soft Keyboards", Intl Conf. on Intelligent User Interfaces 2010, Feb. 2010, pp. 111-118.

Ady et al., "Systems and Methods for Predictive Text Entry for Small-Screen Devices with Touch-Based Two-Stage Text Input" United States Patent and Trademark Office U.S. Appl. No. 13/833,904 (CS39977) filed Mar. 15, 2013, 53 pages.

International Preliminary Report on Patentability from International Application No. PCT/US2013/054660, dated Feb. 26, 2015, 6 pp.

* cited by examiner

SYSTEMS AND METHODS FOR TOUCH-BASED TWO-STAGE TEXT INPUT

FIELD

The present teachings relate to systems and methods for touch-based text input for electronic devices. The text may include alphanumeric characters, punctuation, mathematical indication, font elements, and icons (e.g., emoticons and other small graphical images).

BACKGROUND

In the field of portable communication services, manufacturers have built ever-more capable wireless devices into increasingly compact form factors. Some wireless devices include a liquid crystal display (LCD) touch screen or other interactive display devices that occupy a comparatively small area. For example the MOTOACTV™ fitness tracker has a touch screen size of 1.6 inches (40.64 mm) with a resolution of 176×220 pixels. One of the challenges in bringing a high-function, small-screen electronic device, such as a watch or other wearable electronic device, to market is the fact that the limited screen area makes it difficult to display a full range of typed characters or other symbolic information in the available touch screen space.

Instead of using a touch screen, some devices use up/down buttons to scroll through an alphabet and select characters for text entry. When a desired letter is displayed, an enter button can be used to select that letter. Of course, a touch screen can be used to implement virtual scroll and select buttons in a similar fashion. This type of text entry mechanism, however, may be cumbersome and frustrating to the user, because it can potentially require very long scrolling actions to arrive at a letter or other symbol the user wishes to enter into a messaging, dialing, or other program.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
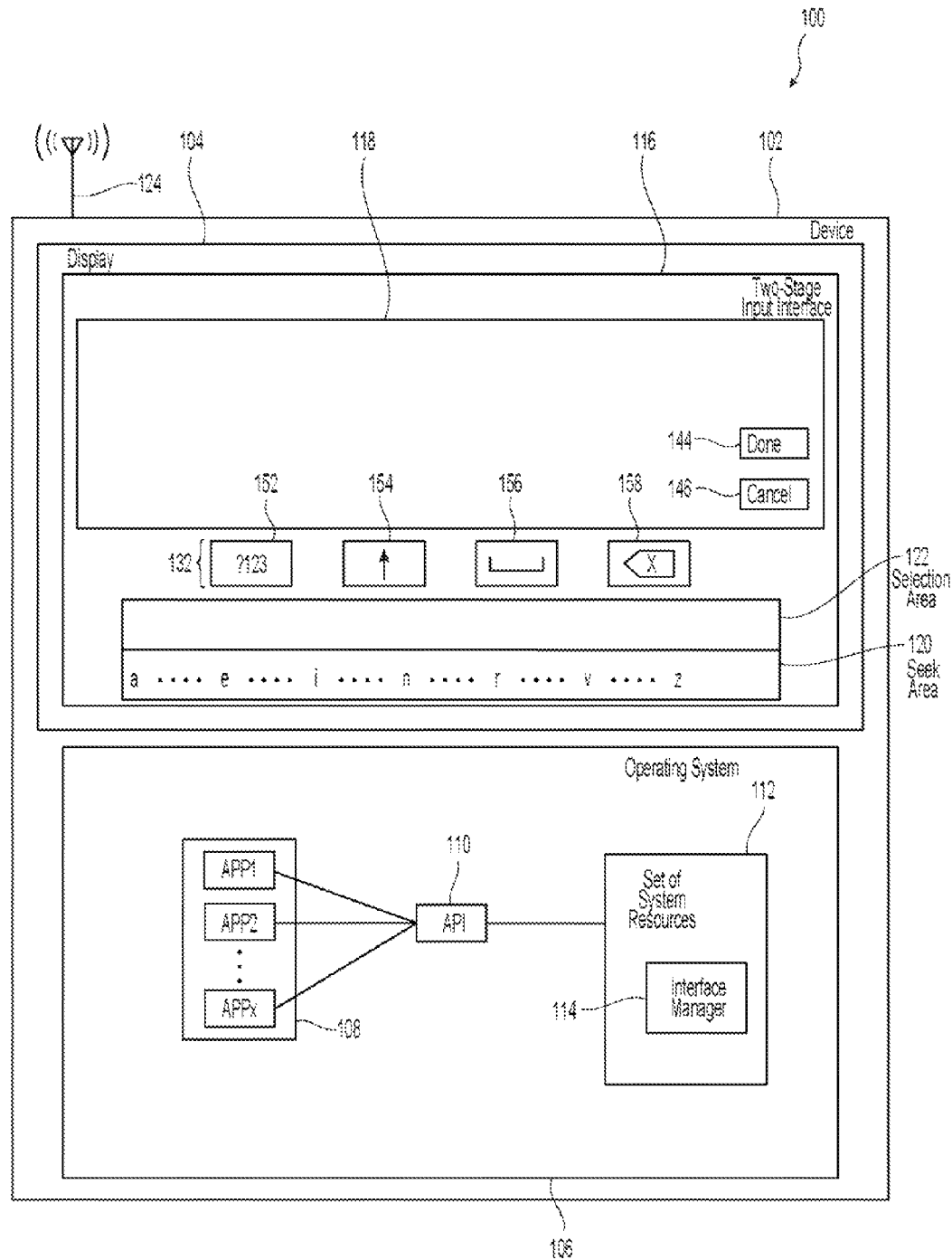
FIG. 1 illustrates an overall environment in which systems and methods for touch-based two-stage text input can be incorporated into an electronic device, according to various implementations.

Embodiments of the present teachings relate to systems and methods for touch-based two-stage text input. These ideas were originally developed for a compact mobile electronic device having a touch screen size of 1.6 inches (40.64 mm) with a resolution of 176×220 pixels but these ideas can be implemented in electronic devices of other sizes including those with both larger and smaller touch screens. More particularly, embodiments relate to platforms and techniques for a two-stage interface for receiving user input on a touch screen device, in which the user can be presented with a seek bar or area which represents the entire range of letters, characters, numbers, and/or other symbolic information in a compressed format.

For example, in a seek bar that presents the entire range of the letters of the English alphabet, the seek bar may present every other letter, for a total of 13 displayed letters, or can present other subsets of the full range of available letters. The user can touch the display at a first point in the seek bar near the area of a letter the user desires to select and enter, such as, for example, at or near the letter "m" in the seek bar. In some implementations, a selection bar or area, as a second graphical interface element, can then be generated and/or updated based on the user's touch at the first point. The selection bar is configured to display the letters surrounding the first point touched on the seek bar. Thus, in the case of the user touching a first point at or near the letter "m" on the seek bar, the selection bar or area can present the user with the individual letters "k l m n o," or shorter or longer sets of the letters surrounding the letter "m" in the alphabet (assuming a linear representation of the alphabet). The user can then slide the finger from the first point to touch a second point, for example, the letter "n" displayed in the selection bar, if that is the letter the user wishes to select as input. Upon lifting off that second point, and/or by other user actions, the selected letter "n" can then be inputted to a text editing box or other dialogue.

The user can then repeat the process of targeting a range for, and then selecting, individual letters or other symbolic elements, until the user completes a desired input string. The user can select or activate a "done" button or other control when the message is composed or completed, to send the text string to an application and/or other software or service, such as a messaging or dialing application. In various aspects, the activity of entering text, character, numeric, and/or other types of symbolic information can be facilitated for a user operating an electronic device having a comparatively small touch screen, including those that do not easily support the display of full or unabbreviated character sets in the available screen area and selection of one character from the full character set in a single-stage manner.

Reference will now be made in detail to exemplary embodiments of the present teachings, which are illustrated in the accompanying drawings. Where possible the same reference numbers will be used throughout the drawings to refer to the same or like parts.

FIG. 1 illustrates an overall environment 100 including an electronic device 102 incorporating various aspects of systems and methods for touch-based two-stage text input. The electronic device 102 can include a network-enabled communication component, such as, for example, a cellular (3GPP, 3GPP2, LTE) transceiver, a WiFi (IEEE 802.11) transceiver, a WiMAX (IEEE 802.16) transceiver, a Bluetooth (IEEE 802.16) transceiver, an infrared transceiver, and/or other standardized or proprietary communication transceivers and communication buses (such as Ethernet and USB). With such a transceiver, the electronic device 102 can support voice and/or data communications and thus may include a dialing (e.g., telephony) application, a messaging (e.g., email, text messaging, instant messaging) application, a digital audio (e.g., MP3) player application, and/or a data synchronization application.

The electronic device 102 can have a small form-factor such as a watch-style device, an arm-band device, a belt-style device, or a head-set device. As shown, the electronic device 102 can host or incorporate a number of hardware, software, and/or other resources, including a display 104 and an operating system 106.

The display 104 can be or include a light-emitting diode (LED) or liquid crystal display (LCD), and/or displays having other types of panels or illumination elements. In some implementations, the display 104 can incorporate hardware-based input components, such as, for example, a capacitive or resistive touch-sensitive panel allowing the user to enter data based on touch-points or other actions on the screen. As noted, the electronic device 102 can be configured in a comparatively small form factor, but the touch screen or display screen may be larger for low-vision applications or other use cases. It may be noted that the electronic device 102 can incorporate other input and output devices, such as, for example, audio output via a speaker, and/or audio input via a microphone, and/or control input via mechanical buttons or switches.

As shown, the electronic device 102 can host or incorporate further hardware, software, and/or other services or resources to provide an overall framework for operating the electronic device 102 and conducting input, communications, and/or other activity. The resources of the electronic device 102 can include, for example, an operating system 106 installed on the electronic device 102 and controlling the data storage, processing, communications, and/or other resources of the electronic device 102 and/or accessed via the electronic device 102. As shown, the electronic device 102 can host a set of applications 108 running under the operating system 106. The set of applications 108 can be or include one or more applications and/or other software, services, and/or routines such as telephony applications, messaging applications including texting, instant messaging, and/or email applications, word processing applications, spreadsheet applications, database applications, social networking applications, digital audio/video player applications, and/or others.

The set of applications 108 can access any one or more of a set of system resources 112 hosted by or incorporated in the electronic device 102 via an application programming interface (API) 110, and/or other interface, channel, bus, and/or connection. The set of system resources 112 can include various hardware, software, and/or other services, logic, or resources such as electronic memory, local storage such as disk-based, optical, and/or electronic storage, communications resources such as ports, transmission hardware, and/or a set of antennas 124 to permit wireless network operations, such as connection to the Internet and/or other public or private networks, such as by cellular telephone wireless data packets, WiFi™ connections or sessions, and/or others.

The set of antennas 124 can be or include a single antenna or a set of multiple antennas, for diversity and/or other purposes. The set of antennas 124 can be mounted externally to the electronic device 102 (as shown), and/or can be mounted internally to the electronic device 102, and/or can be mounted in other configurations. The set of system resources 112 can include an interface manager 114, which can be a set of routines, logic, services, and/or other resources executing and/or supporting the processing of input to and/or output from the electronic device 102, including a two-stage text input interface 116 generated and presented on the display 104. According to some implementations, the interface manager 114 and/or associated logic can be implemented as a self-running system application, service, and/or other resource that handles text input and editing operations, and/or operations on other symbolic elements.

In some implementations, the interface manager 114 may not report every entered letter or other symbolic element back to the calling application, upon completion of the entry of each individual symbolic element. Instead, the interface manager 114 may only report a completed string after a user indicates that the complete string has been entered by touching a "done" virtual button 144 on the touch screen. The two-stage text input interface 116 can incorporate a number of dialogues, selection buttons or boxes, and/or other interface features to permit the user of device 102 to enter textual and/or other symbolic information into the electronic device 102, despite a comparatively limited viewing area on display 104. While the "done" virtual button 144 is illustrated as a virtual button, in implementations, that button and any other of the buttons, keys, or switches may be mechanical or virtual.

As shown, the two-stage text input interface 116 can include a view and/or display area on the display 104 with a selection component, such as a capacitive or resistive touch panel, in which the user of electronic device 102 can input various data and perform other operations. In various aspects, the user can operate the two-stage text input interface 116 to access a seek area 120 from which the user can access or enter a selection area to view and enter elements from a set of symbolic elements 148 (shown, e.g., in FIGS. 4-7). The seek area 120 can be configured in a linear (or bar) format, in a two-dimensional format, and/or in other formats or arrangements. The set of symbolic elements 148 can include any type of symbolic data, characters, and/or elements, such as, for example, an alphabet in English and/or other languages, a set of numbers and/or other numeric information, a set of symbols, such as, for example, commas, periods, parenthesis, and/or other typing or grammatical symbols, mathematical symbols, icons or other graphical information, keyboard or telephone keypad symbols, and/or other characters, data, or information.

In certain implementations, the set of symbolic elements 148 and/or other characters, figures, marks, and/or information is too long and/or occupies too much screen area to fit into the seek area 120 of the display 104, while in other implementations, the set of symbolic elements 148 and/or other characters, figures, marks, and/or information may be represented in full form on the display 104. The set of symbolic elements 148 can be displayed in abbreviated format by, for example, showing only every Nth letter of the set (where N>=2) or by showing only representative elements of the set (e.g., one happy face for a range of positive expression icons and one sad face for a range of negative expression icons).

As shown, the two-stage text input interface 116 can include a set of controls 132 to operate the two-stage text input interface 116 and to select various input processing or other actions, such as to select, navigate, underline, and/or delete letters or other symbolic information, among others, according to platforms and techniques described herein. The set of controls 132 shown include a number of virtual buttons with icons to activate various controls or actions. Of course, the controls 132 could be implemented as mechanical buttons, voice control instructions, gesture-based motions of the electronic device (e.g., as supported by a gyroscope or accelerometer) or a combination of virtual button, mechanical button, voice control, or motion-based inputs.

For example, the set of controls 132 includes a "selection" virtual button 152 that can be activated to switch between different sets of symbolic elements, such as letter sets, character sets, symbol sets, icon sets, and/or others. An upper/lower case (or "shift") virtual button 154 can be activated to switch between lowercase and uppercase formats for the symbolic elements. A "space" virtual button 156 can be activated to insert a blank space in the text editing box 118 and/or other dialogue entry area. A "delete" virtual button 158 can be activated to delete or remove a selected symbolic element or elements from the text editing box 118 and/or other dialogue entry area. It will again be appreciated that while four specific, virtual buttons are shown in the illustrated set of controls 132, other amounts, types, layouts, and configurations of buttons, switches, keys, and/or other icons or controls can be used, including mechanical versions of those elements.

During operation, the two-stage text input interface 116 can generate and/or display the seek area 120 to present a comparatively compact, abbreviated, filtered, truncated, and/or otherwise reduced representation of the set of symbolic elements. For example, the seek area 120 can display a set of sampled letters taken from the complete English alphabet, such as "a . . . e . . . l . . . n . . . r . . . v . . . z", as shown, although it will be appreciated that other selections or samplings of letters or other symbolic elements can be used. In some implementations, the reduced and/or otherwise modified representation of the full set of symbolic elements 148 and/or other characters, figures, marks, and/or information shown in the seek area 120 can be regularly separated, sampled, and/or spaced within the ordinal or ordered list or arrangement of the set of symbolic elements 148. Thus, the reduced and/or modified representation of the set of symbolic elements 148 can present every other symbolic element, every third symbolic element, every sixth symbolic element, and/or other ordered arrangements which are spaced apart using other spacing or sampling rules or techniques. As further examples, the reduced representation of the set of symbolic elements 148 and/or other characters, figures, marks, and/or information can be generated using irregular and/or variable spacing, ordering, or separation between the symbolic elements of the set of symbolic elements 148. The reduced or modified representation of the full set of symbolic elements 148 and/or other characters, figures, marks, and/or information presented in the seek area 120 can permit the user to view a depiction of the entire range of the set of symbolic elements 148 available for selection, without necessarily showing every element in the set of symbolic elements 148.

Figure 2:
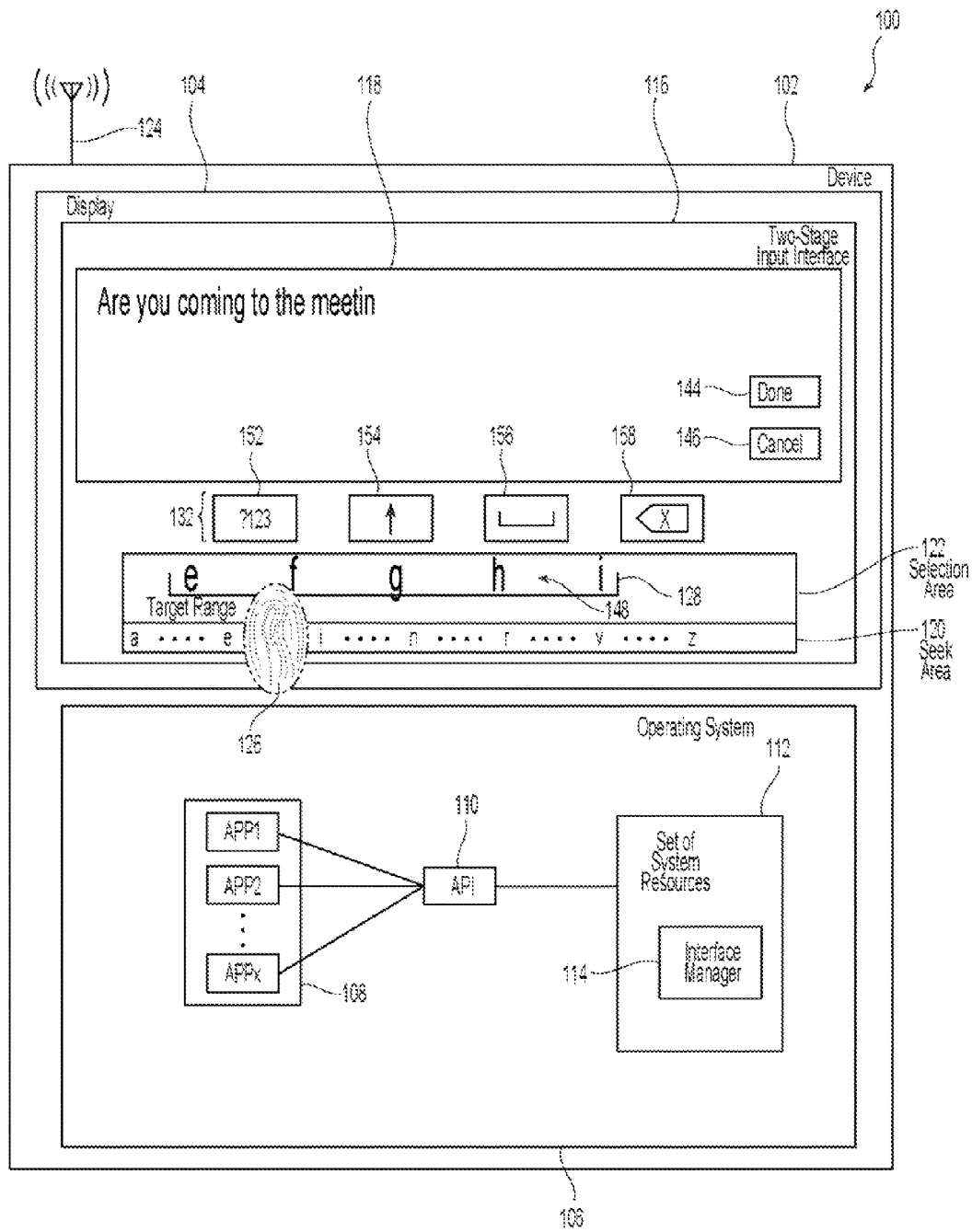
FIG. 2 illustrates input processing activity that can be carried out on a compact mobile communications device using systems and methods for touch-based two-stage text input, according to various implementations incorporating a one-dimensional seek area and a one-dimensional selection area.

According to various implementations, and as shown in FIG. 2, the user can view the reduced or modified representation of the set of symbolic elements 148 in the seek area 120 and touch a first point 126 on a surface of the display 104 on or around a desired letter or other element, to cause a target range 128 of the set of symbolic elements 148 and/or other characters, figures, marks, and/or information to appear in the selection area 122. The target range 128 is a selection or subset from the full set of symbolic elements 148 so that, for example as shown, two letters adjacent to both sides of the letter "g" selected in the seek bar can be displayed. Other ranges of symbols surrounding a selected symbol can be used. For example, if representative happy, sad, and neutral emoticons were displayed in the seek area 120, touching the happy emoticon may result in a target range 128 of five different types of happy emoticons to be displayed in the selection area 122.

The target range 128 is a subset of the entire set of symbols available for text entry. In some implementations, the selection area 122 can likewise be configured in a linear or bar format, in a two-dimensional or matrix format, and/or in other formats or arrangements. The selection area 122 can include touch-screen input elements so that the user can touch a first point on the seek bar, view in the selection area 122 the target range 128 symbols related to the first touch point, then drag and/or otherwise reposition the finger or a pointing instrument on one element in the target range on the selection bar 122 that the user wishes to select.

Figure 3:
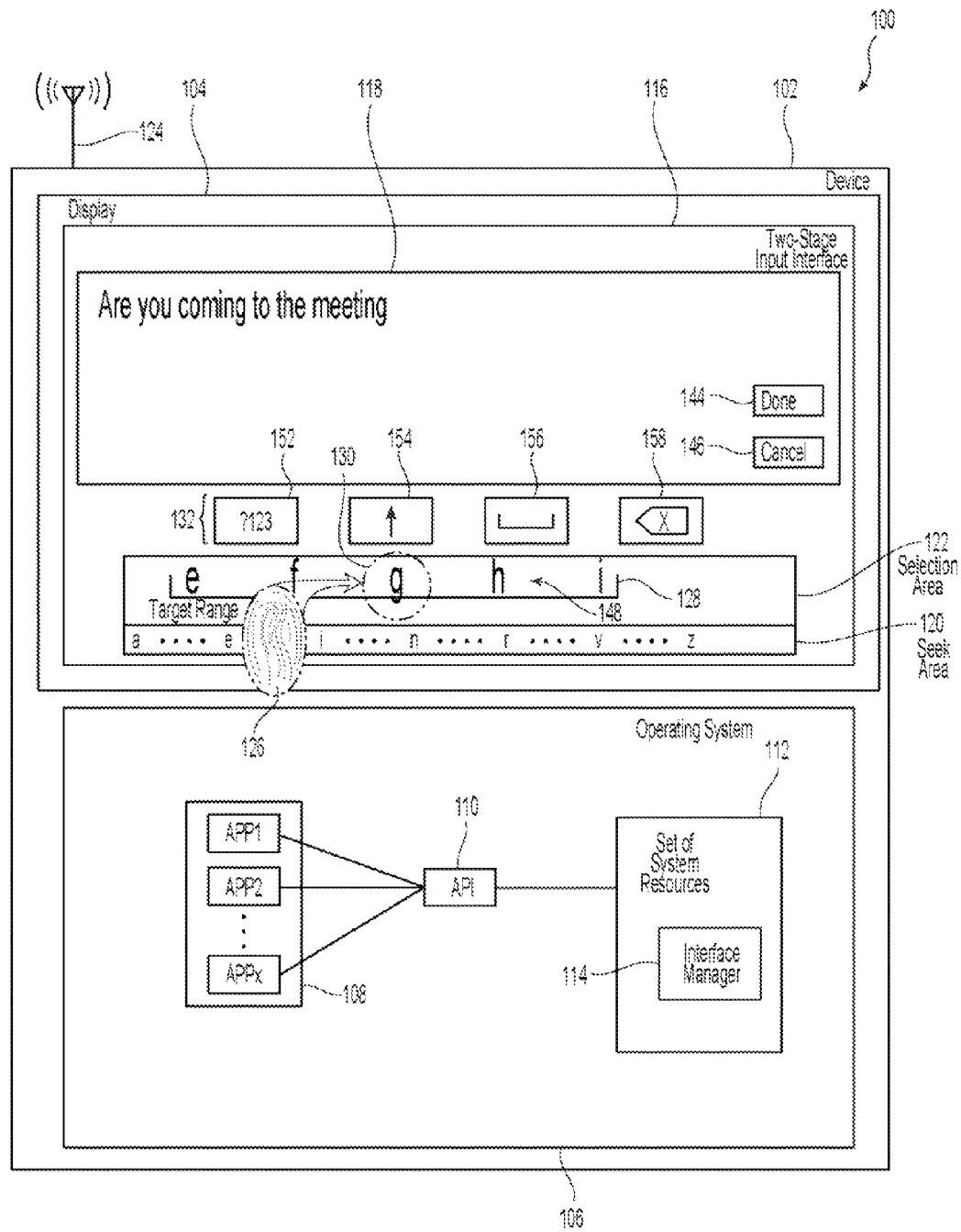
FIG. 3 illustrates input processing activity that can be carried out on an electronic communication device using systems and methods for touch-based two-stage text input, according to various implementations in further regards.

For example, as shown in FIG. 3, after the user has identified and/or selected the letter and/or other symbol the user wishes to input, the selected letter or other symbolic elements can appear in a text editing box 118 and/or other dialogue of the two-stage character input interface 116. The text editing box 118 can, in various implementations, be configured to display a "done" virtual button 144, and/or a "cancel" virtual button 146, as shown, as well as other buttons and associated operations. Of course, the virtual buttons may be replaced by mechanical buttons that perform the same functions. The "done" virtual button 144 can allow the user to indicate the completion of a textual string and/or other input and, for example, initiate the transmission of a message contained in the text editing box 118 to a messaging application in the set of applications 108, dial a telephone number indicated by a string contained in the text editing box 118, search for a song title with a phrase indicated by a string contained in the text editing box 118, or to perform other actions. The "cancel" virtual button 146 can allow the user to cancel and back out of the entry of a textual string and/or other input, for example, to start another message or to take other actions.

The input operation of selecting a character (e.g., letter, number, symbol, icon, etc.) by touching a first touch-point in the seek area 120, followed by touching a second touch-point in the selection area 122 can be accomplished using one continuous and/or uninterrupted motion by the user, who may touch and drag a finger and/or pointing instrument from a first touch-point 126 on the touch screen display 104 to a second touch-point 130 on the touch screen display 104, without lifting the finger or instrument off the surface of display 104. Alternately, the two touches may be separate, with a lifting of the finger off the surface of the display 104 between the two touches.

Additionally, the first touch-point may be a sequence of touch-points within the seek area 120, with the final touch-point operating to determine the target range 128 available for selection in the selection area 122. For example, the user touches a first point in the seek area 120 with a finger or pointing instrument and moves the finger continuously along the seek area 120 to cause continuous updating of the target range 128 shown in the selection area 122. If the target range 128 is updated in a smooth, continuous manner, the letters and/or other symbolic elements displayed in the target area 128 may seem to scroll left, right, and/or otherwise, following the moving touch-point on the seek area 120 in a real-time or near real-time manner. Continuing the example, if the user slides the finger off the seek area 120, the target range 128 displayed at the time the finger leaves the seek area 120 is the target range 128 available for selection of a character. The user then may continue the glide motion and touch a second point in the selection area 122. As feedback to the user, a character related to the second point may be highlighted by enlarging that character or changing its color. This may assist the user to select a desired character. When the desired character is touched, a lift off of the finger from a second point 130 in the selection area 122 adds the symbolic element to the text editing box 118.

In those regards and others, the entry of letters or other symbolic elements via the two-stage character input interface 116 can therefore be performed with a single action using one finger or instrument, although the two-stage character input interface 116 can also be configured to accept pauses and/or discontinuities in the user's input contact with the display 104. For example, the user may touch a first point 126 in the seek area 120, lift the finger from the seek area 120 to select a target range 128, touch a second point 130 in the selection area 122, and lift the finger from the selection area 122 to select a character to be entered in the text editing box 118.

According to various implementations, the two-stage character input interface 116 can likewise be configured so that if the user moves their finger and/or pointing instrument all the way to either end of the selection area 122, the target range 128 shown in the selection area 122 can enter a slow-scrolling action or mode, in which one symbolic element emerges at a time. When the desired element appears in this end-of-range slow-scrolling mode, the user can then lift the finger and/or pointing instrument off the desired letter and/or other symbolic element to select that element. Other techniques can be used to present the set of symbolic elements 148 beyond the ends or boundaries of the available target range 128 as initially shown in the selection area 122. Again, the character under the second touch-point may be highlighted to indicate the character that will be selected if the finger lifts off from that touch-point.

In another example, if the user touches a first point 126 in the seek area 120 to select a target range 128 and lifts the finger and/or pointing instrument directly off from the seek area 120, the two-stage character input interface 116 can be configured to present the corresponding target range 128 in the selection area 122 for a predetermined amount of time in a "hanging" display fashion. If the user resumes by touching a second touch-point in the selection area 122, the letter and/or other symbolic element selected can be highlighted, such as by becoming enlarged and/or changing color. Upon lift off of the finger from the selection area 122, the highlighted symbolic element is entered into the text editing box 118. Alternately, the user may touch another first point in the seek area 120 to select another target range 128 and continue text entry as previously described.

Further, as another example, when a user's finger or pointing instrument does not contact the display 104 for a predetermined time, such as for example 5 seconds, the two-stage character input interface 116 can be configured to return to an initial or default condition and/or position of the set of symbolic elements 148. In some implementations, a default condition in those scenarios presents a target range 128 positioned at or from the middle or center of the set of symbolic elements 148 available from the selection area 122, positioned at or from the first symbol and/or other beginning of the set of symbolic elements 148, positioned at or from the last symbol and/or other end of the symbolic elements 148, and/or positioned at or from a set of most-likely next characters based on any existing text in the text entry box 118.

Figure 4:
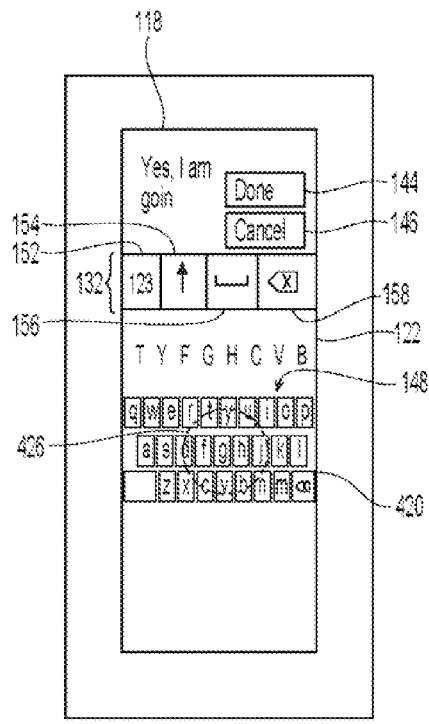
FIG. 4 illustrates input processing activity that can be carried out on a communications device using systems and methods for touch-based two-stage text input, according to various implementations incorporating a keyboard-type seek area and a one-dimensional selection area.

While implementations shown in FIGS. 1-3 incorporate a seek area 120 that is configured as a one-dimensional and/or linear representation of the set of symbolic elements 148 in the form of alphabetic characters, in other implementations, the seek area 120 can be configured in a two-dimensional format and/or can depict additional or different symbolic elements. FIG. 4 shows a seek area 420 configured to display the letters of the English alphabet in keyboard or "QWERTY" format, in a two-dimensional representation. In the implementation shown in FIG. 4, the keyboard-type object depicted in the seek area 420 has the letters of a standard QWERTY-type keyboard, without any additional numbers, grammatical symbols, and/or other symbolic elements, but it will be appreciated that other versions of keyboard keys and/or symbolic elements can be used. As shown, the user can generally carry out similar input operations as described with respect to the examples shown in FIGS. 1-3, but the interface manager 114 and/or associated software or logic can be configured to identify the target range 128 and/or other data based on a two-dimensional location or other input supplied via the user's first touch-point on the seek area 420. When the two-stage input interface 116 has received a user touch-point in the seek area 420, for example, the two-stage character input interface 116 can then generate and present the target range 426 in a selection area 122 with a one-dimensional or linear representation of the target range 426, for example, by presenting letters and/or other symbolic elements clockwise from the upper right corner of a surrounding block of letters of a predetermined size. Other rules for incorporating surrounding or adjacent symbols into the selection area 122 can be used, including selecting different numbers and/or ranges of letters surrounding the user's first touch-point selection in the seek area 420.

Figure 5:
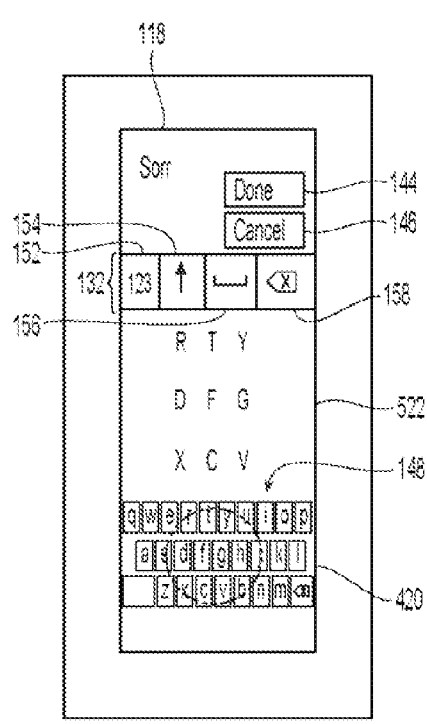
FIG. 5 illustrates input processing activity that can be carried out on an electronic device using systems and methods for touch-based two-stage text input, according to various implementations incorporating a keyboard-type seek area and a two-dimensional selection area.

In other implementations, and as for example shown in FIG. 5, when selecting from a two-dimensional QWERTY keyboard and/or other object or depiction in the seek area 420, the two-stage character input interface 116 can also present a two-dimensional representation of a target range 526 in a two-dimensional selection area 522. In examples as shown, the two-dimensional representation of the target range 526 in the selection area 522 can be presented in the form of all letters and/or other symbolic elements within one symbol of the selected letter and/or symbol, but again, other selection rules and/or numbers of surrounding symbolic elements can be used. In these and other implementations it may be noted, again, that further or different selection rules can be used by the interface manager 114 and/or other logic, software, and/or service.

Figure 6:
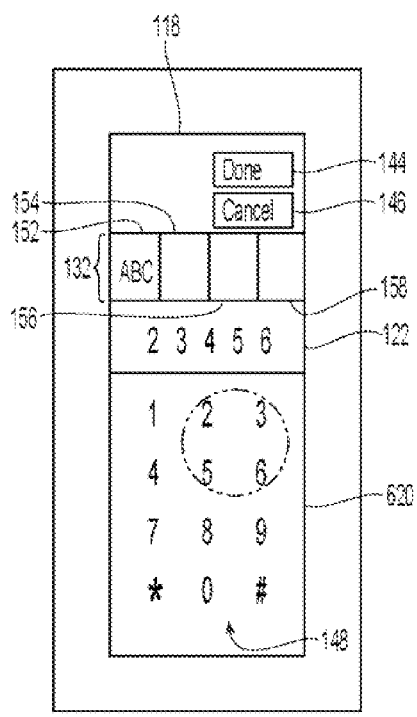
FIG. 6 illustrates input processing activity that can be carried out on an electronic device using systems and methods for touch-based two-stage text input, according to various implementations incorporating a telephone keypad-type seek area and a one-dimensional selection area, according to various implementations.

According to various aspects, while certain of the foregoing implementations have incorporated letters and/or other alphabetical elements, for example, the set of symbolic elements 148 can in addition or instead include other elements, such as numbers, symbols, icons, and/or other graphical elements. As illustrated in FIG. 6, for example, after a touch input or other selection action has been received, the seek area 620 can in implementations present numeric and other information related to a representation of a telephone keypad, which as shown can be arranged in the rows and columns of a traditional telephone keypad. This representation in the seek area 620 can be useful, among other aspects, when electronic device 102 incorporates a cellular telephone capability, but lacks a dedicated dialing keypad and/or other dialer interface. As shown, the associated selection area 122 can incorporate a one-dimensional or linear representation of the target range 626, in the manner described herein. For example, selection of a number and/or other elements in such implementations can be used to conduct telephone number entry for dialing operations using the electronic device 102, and/or can be used for other number entry.

Figure 7:
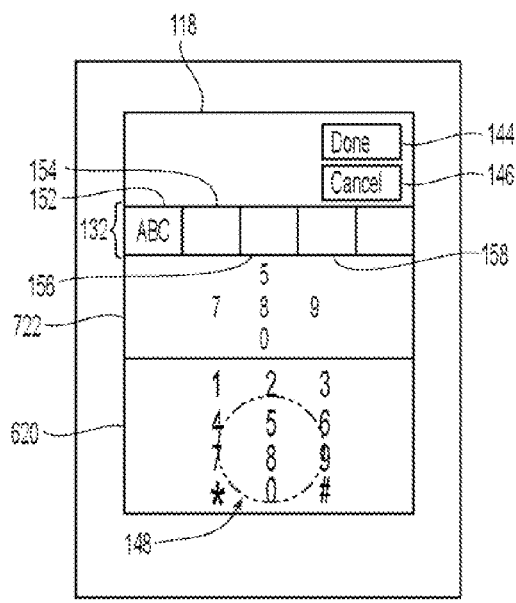
FIG. 7 illustrates input processing activity that can be carried out on an electronic device using systems and methods for touch-based two-stage text input, according to various implementations incorporating a telephone keypad-type seek area and a two-dimensional selection area, according to various implementations.

In another example, as illustrated in FIG. 7, the seek area 620 can present the numeric and/or other information in a representation of a telephone keypad, but the associated selection area 722 can present numeric and/or other elements in a two-dimensional format for a target range 726 in the selection area 722. Again, the rules by which the interface manager 114 arranges or configures the symbolic elements of the target range 726 in the selection area 722 can vary, so that different ranges, directions, and/or samplings of symbols can be presented for user identification and/or selection in the selection area 722.

Figure 8:
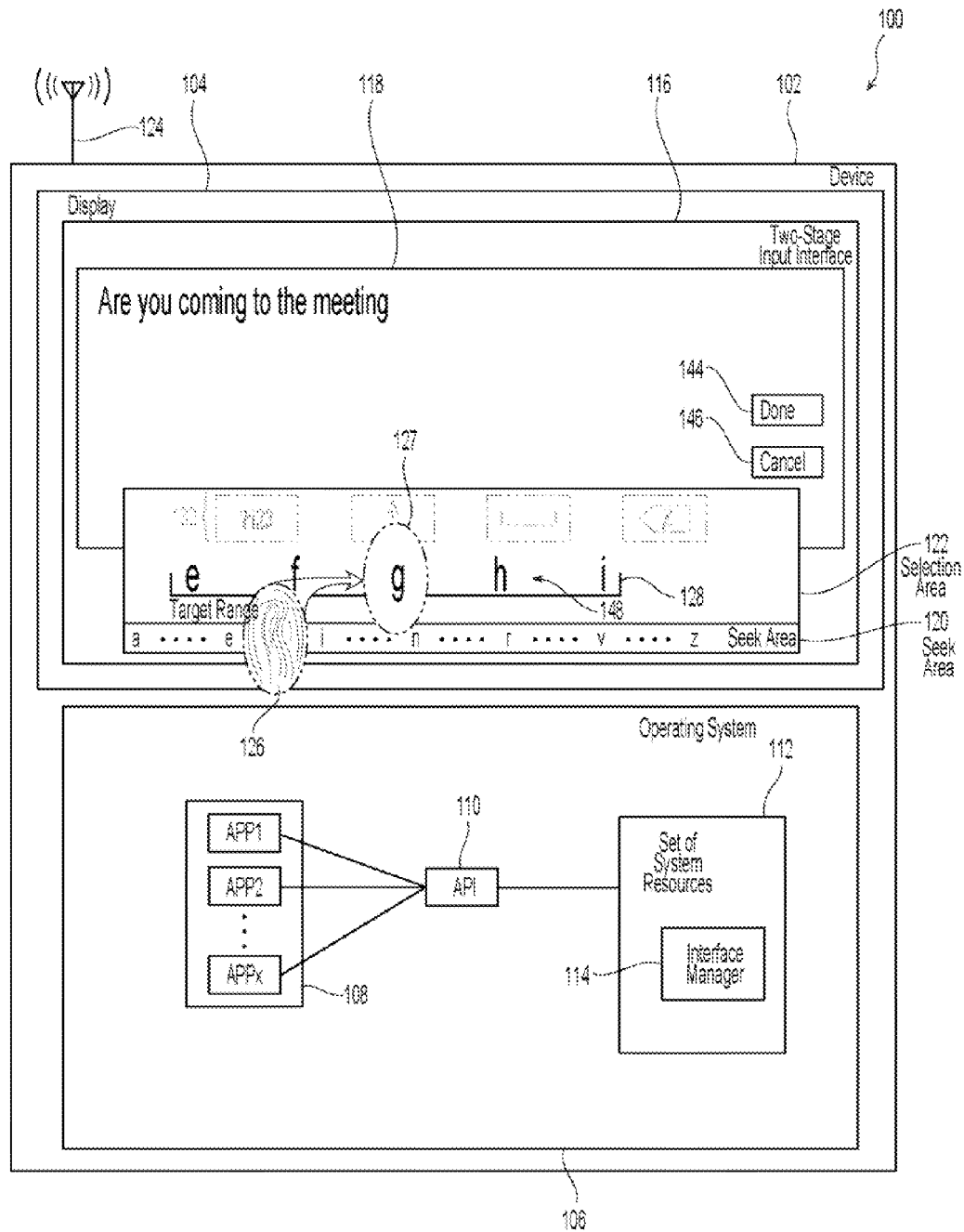
FIG. 8 illustrates the re-configuration of various interface elements that can be incorporated in systems and methods for touch-based two-stage text input, according to various implementations.

In various further implementations, and as for example shown in FIG. 8, the interface presented on the display 104 can be adapted or configured to achieve increased efficiency of use of the available screen area of the display 104, based on certain operating conditions. Those conditions can include the re-deployment or overlaying of graphics on certain areas of the display 104 and/or two-stage character input interface 116, at times when other display areas are not in use or needed. For example, in FIG. 8, at times during operation of the electronic device 102 when the user is operating within the selection area 122 to select, lift off, and enter a selected letter or other symbol, and/or performing other actions, it may not be necessary to display the set of controls 132, especially when those controls have no bearing on the selection or entry of individual letters or other symbols. During those times or others, the interface manager 114 can for example dissolve, ghost out, and/or otherwise remove or disable the set of controls 132, and allocate the display area occupied by those elements to the selection area 122, on a temporary basis. The interface manager 114 can revert to displaying the set of controls 132 at their default location after the user has successfully selected and/or entered a character, and/or after the expiration of a predetermined timeout period. Other conditions for the display or suppression of interface elements can be used.

Similarly, in some implementations, other interface gadgets, dialogues, buttons, and/or elements of the two-stage character input interface 116 and/or touch screen display 104 can be alternated, re-configured, and/or substituted, when operation of the electronic device 102 and/or the set of applications 108 does not require them to be displayed or accessible. For example, during initial operation and/or at other times, the "done" virtual button 144 and/or "cancel" virtual button 146 can be displayed in the text editing box 118 with any already-entered text (e.g., a previous message) ghosted or as background. After a first touch or other input in the seek area 120, the text editing box 118 can display the entered letters and/or other symbols in normal font or relief, with the "done" virtual button 144 and/or "cancel" virtual button 146 being removed, ghosted, or no longer selectable until a second touch is made in the selection area 122.

Conversely, before the user has touched a first point 126 in the seek area 120 to locate a desired target range 128, and/or at other times, it may not be necessary to display the selection area 122, and instead, the set of controls 132, and/or an expanded set of virtual control buttons, can be displayed in an area including the section dedicated to the selection area 122 when in use.

It will be appreciated that dynamically re-configuring the size, position, and/or other attributes of the displayed interface elements can provide benefits including enlarged buttons for easier selection, enlarged letters or other symbols for increased legibility, an ability to display more controls or symbols, and/or other enhancements. It will be appreciated that other conditions or criteria can be used to switch, re-align, alternate, and/or otherwise change the configuration of interface elements in the two-stage character input interface 116 and/or touch screen display 104, to gain more efficient use of the display area, or for other purposes.

Figure 9:
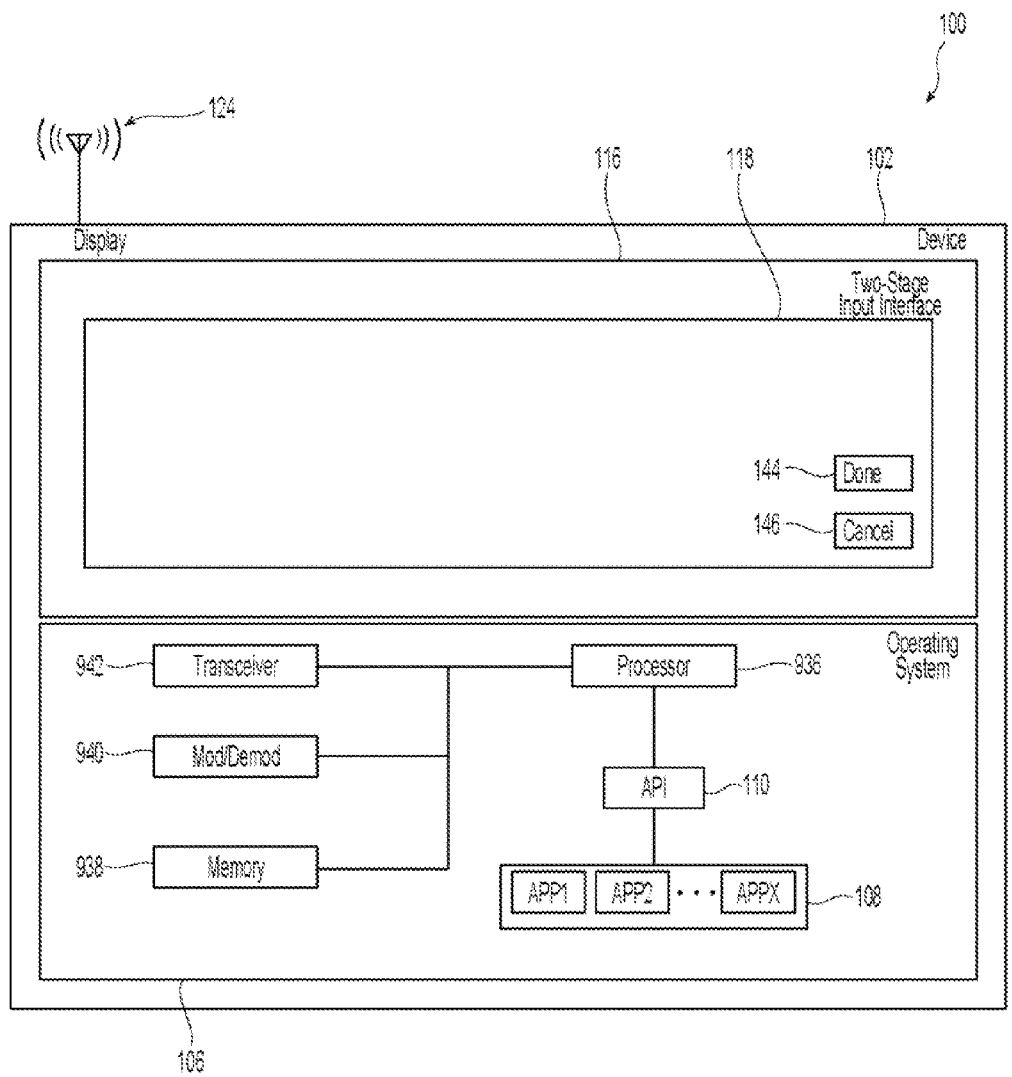
FIG. 9 illustrates exemplary hardware, software, and other resources that can be incorporated in an electronic device used in touch-based two-stage text input, according to various implementations.

FIG. 9 illustrates exemplary hardware, software, and other resources that can be used in various implementations of a touch-based two-stage character input. In embodiments as shown, the electronic device 102 can include a hardware platform including processor 936 communicating with memory 938, such as electronic random access memory, operating under control of or in conjunction with the operating system 106. The processor 936 in embodiments can be incorporated in one or more servers, clusters, and/or other computers or hardware resources, and/or can be implemented using cloud-based resources. The operating system 106 can be, for example, a distribution of the Android™ operating system available from Google, Inc., Mountain View, Calif., a distribution of the Linux™ operating system, the Unix™ operating system, or other open-source or proprietary operating system or platform.

The processor 936 can further communicate with a modulator/demodulator 940 and a transceiver 942, via which the electronic device 102 can transmit or receive wireless signals via antenna element 124, and using those signals establish a connection to one or more networks (not shown), such as the Internet or other public or private networks. In some implementations, the connection to the one or more networks via the antenna element 124 and other resources can be or include a broadband wireless connection, a WiFi™ connection, and/or wireless data connection. While wireless connections are described, it will be appreciated that electronic device 102 can connect with one or more networks (not shown) and/or other networks, access points, and/or services via wired or optical connections, such as Ethernet™ connections, USB connections, or others. The processor 936 can, in general, be or include one or more general-purpose and/or special-purpose processors, cores, and/or related logic, and can programmed or configured to execute and/or control the operating system 106, the set of system resources 112 including the interface manager 114, the application programming interface (API) 110, the set of applications 108, and/or other applications, hardware, software, logic, services, and/or resources. See FIG. 1. Other configurations of the electronic device 102, associated network connections, and other hardware, software, and other resources or services are possible.

Figure 10A:
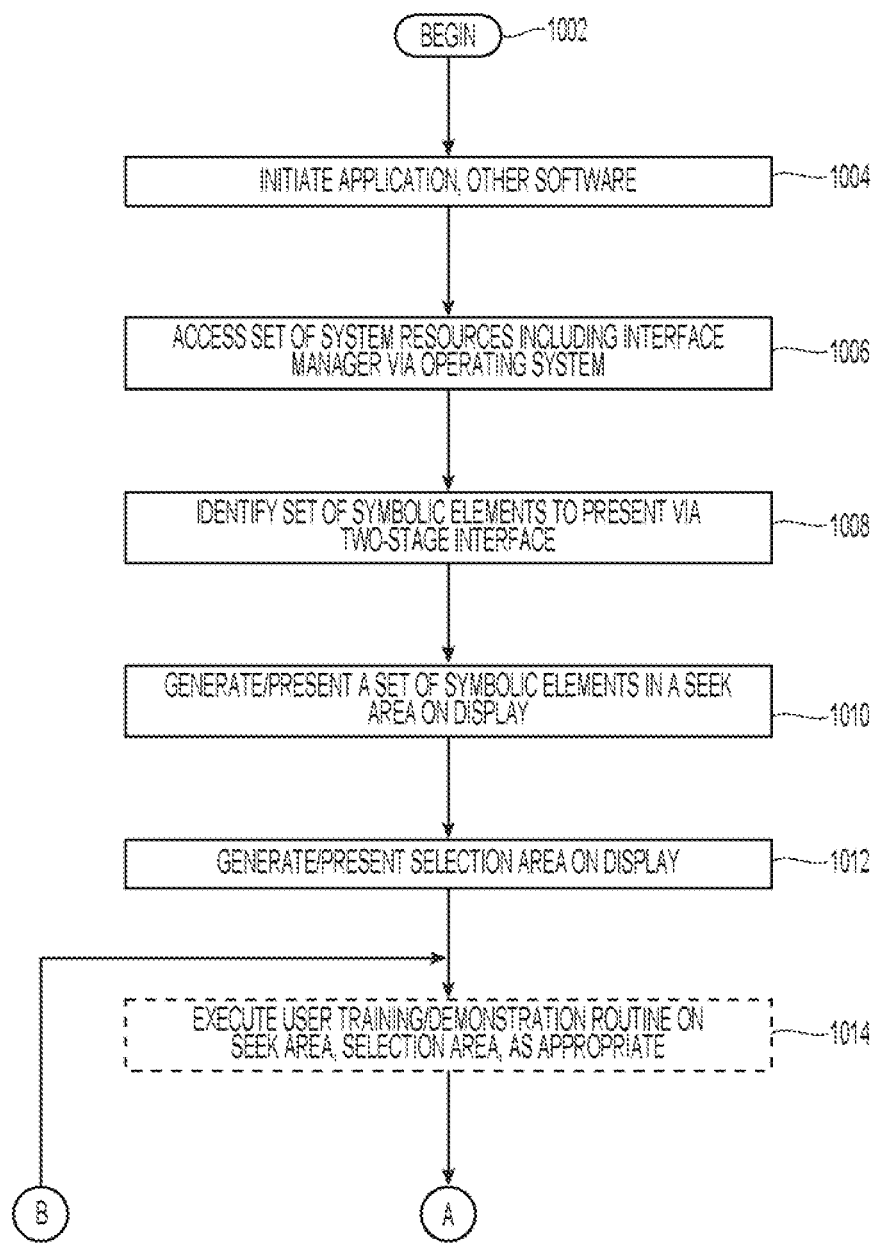
FIGS. 10A-10C illustrate a flowchart of overall input processing activity that can be carried out in systems and methods for touch-based two-stage text input, according to various implementations.
Figure 10B:
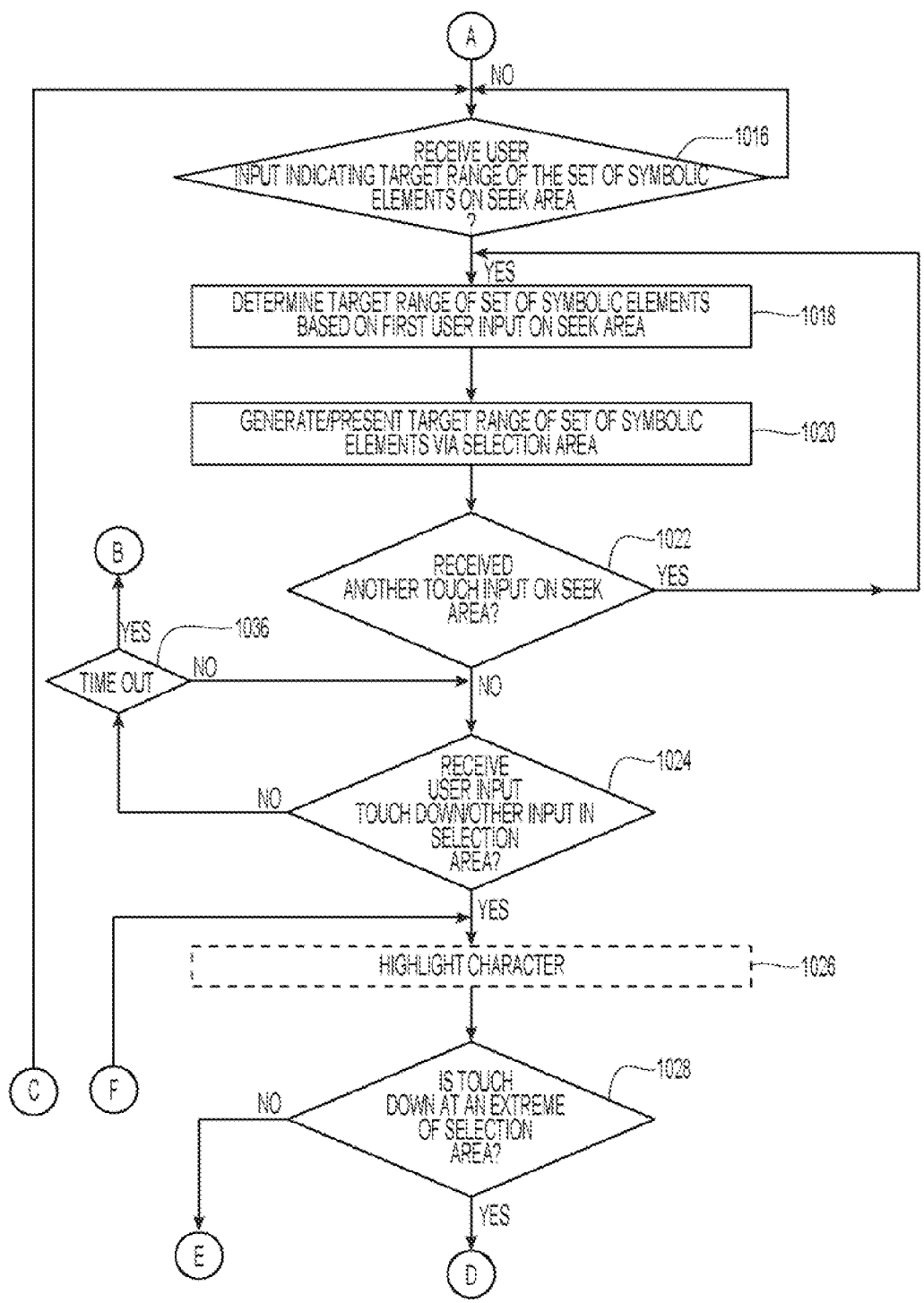
Figure 10C:
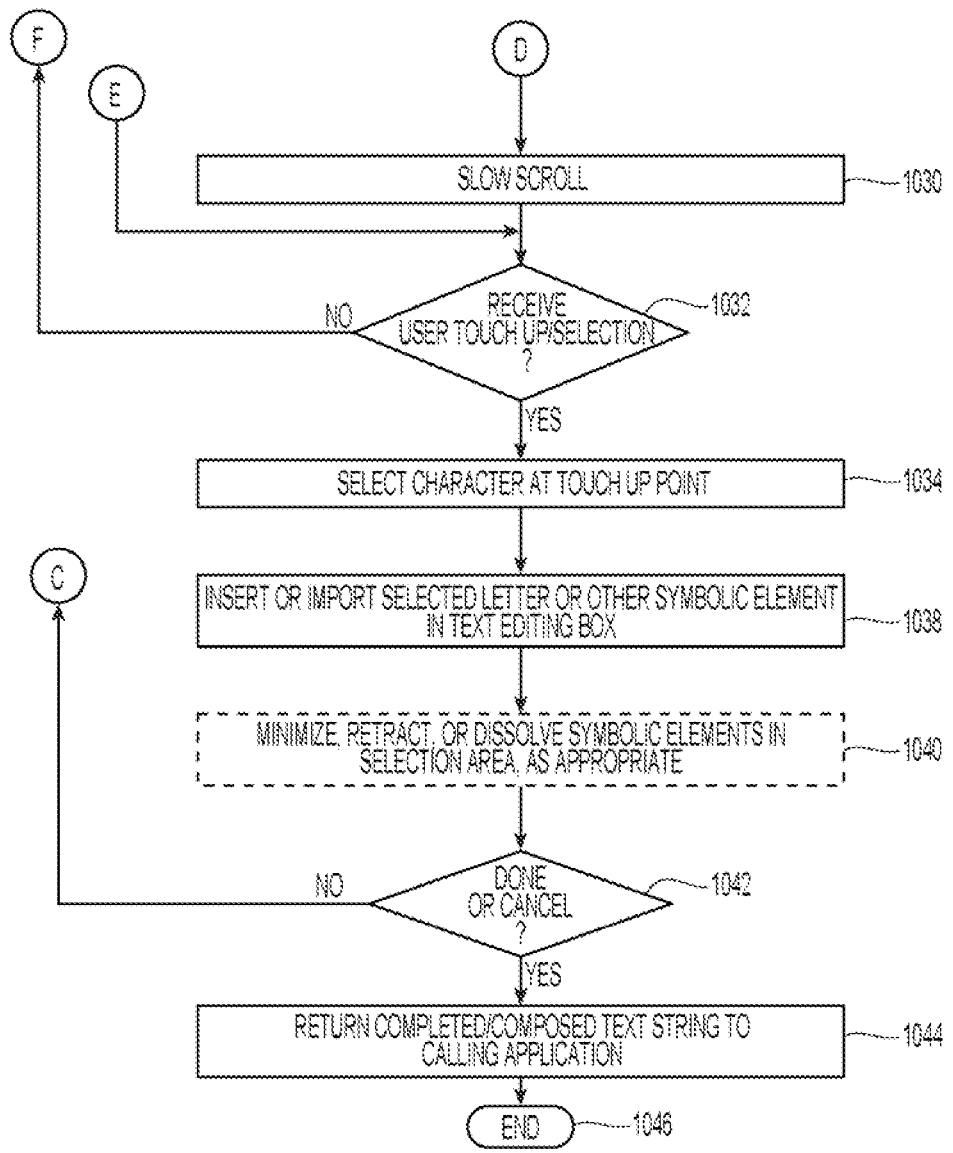

FIGS. 10A-10C illustrate a flowchart of symbol selection and other processing activity that can be performed in systems and methods for touch-based two-stage text input, according to various implementations. In step 1002 (FIG. 10A), processing can begin. In step 1004, a user of the electronic device 102 can initiate and/or access an application in the set of applications 108, and/or other software or service. In step 1006, the application operated by the user can access the set of system resources 112 of the electronic device 102, including the two-stage character input interface 116 and/or interface manager 114, via the application programming interface (API) 110, and/or the operating system 106 of the electronic device 102, directly. In step 1008, the interface manager 114 and/or other logic, software, and/or service can identify and/or select the set of symbolic elements 148 to present via the two-stage text input interface 116 and/or other dialogue, and/or other graphical or visual interface, portal, or service.

In step 1010, the interface manager 114 and/or other logic, software, and/or service can generate, configure, and/or present a character set in the seek area 120 on the display 104. As noted previously, the character set may be presented in full or abbreviated formats. In step 1012, the interface manager 114 and/or other logic, software, and/or service can generate and/or present the selection area 122 on the display 104. Note that there may be no characters presented in the selection area 122 initially or the selection area 122 may present a default set of characters (e.g., a middle target range, a beginning target range, or a set of most-likely next characters).

In step 1014, the interface manager 114 and/or other logic, software, and/or service can optionally execute a user training and/or demonstration routine on the seek area 120, selection area 122, and/or other sections of the two-stage character input interface 116. A user training and/or demonstration routine can include a sequence of graphics representing input actions carried out on the two-stage character input interface 116 to illustrate a manner in which, for example, a first touch in the seek area 120 can select a target range for display in the selection area 122, and a second touch dragged and "lifted off" from the selection area 122 can type or otherwise insert a selected symbolic element from the selection area 122 into a dialogue box of the two-stage character input interface 116 or another application, software, and/or service. In implementations, besides performing the user training and/or demonstration routine of step 1014 during a first time the user may operate the two-stage character input interface 116 and/or associated program(s), that routine can also be performed after the user has caused a timeout event a predetermined number of times, such as two, three, or other times, and/or based on other conditions.

In step 1016 (FIG. 10B), the interface manager 114 and/or other logic, software, and/or service can make a determination whether user input has been received indicating a desired target range 128 of the set of symbolic elements 148 and/or other characters, figures, marks, and/or information based on a touch-point and/or other selection in the seek area 120. For example, the user can touch their finger and/or a stylus or other pointing instrument or device to the surface of the seek area 120 to indicate the point or section of the set of symbolic elements 148 and/or other characters, figures, marks, and/or information that they wish to expand into the target range 128, which action can be detected by the interface manager 114.

If the determination in step 1016 is yes, processing can proceed to 1018, in which the interface manager 114 and/or other logic, software, and/or service can determine, generate, and/or calculate the target range 128 of the set of symbolic elements 148 and/or other characters, figures, marks, and/or information based on the user input provide in the seek area 120. For example, in the case of an area around a touch-point of the letter "p" presented on a linear or one-dimensional seek area 120, the interface manager 114 and/or other logic, software, and/or service can identify a set of adjacent and/or surrounding characters near the letter "p", and present those additional letters with the letter "p" as the target range 128. The interface manager 114 can be configured to select a predetermined number of adjacent and/or surrounding characters around a letter touched in the seek area 120, such as one, two, three, four, or another number of characters adjacent to and/or surrounding the "p" or other selected symbolic element from the seek area 120.

If the determination in step 1016 is no, processing can return or loop back to the determination of step 1016 to continue to attempt to detect a selection of the target range 128. In implementations, a timeout test may be performed to avoid an endless loop state resulting from a no determination in step 1016.

In step 1020, the interface manager 114 and/or other logic, software, and/or service can identify, generate, access, and/or present the target range 128 of the set of symbolic elements 148 and/or other characters, figures, marks, and/or information in or via the selection area 122. In step 1022, the interface manager 114 and/or other logic, software, and/or service can make a determination whether an additional touch input and/or other user selection and/or other identification of a revised desired target range 128 has been received in or via the seek area 120. If the determination of step 1022 is yes, processing can return to step 1018, including determination of a next target range 128. In this manner, successive target ranges 128 can be displayed in the selection area 122. If the target range 128 is updated in a smooth manner, the letters displayed in the selection area 122 may seem to scroll quickly until no more touch inputs are received on the seek area 120.

If the determination of step 1022 is no, processing can proceed to 1024, in which the interface manager 114 and/or other logic, software, and/or service can make a determination whether a user selection and/or other input using a finger or pointing instrument (which may be referred to as a "touch down") has been received in or via the selection area 122.

If the determination of step 1024 is no, processing can proceed to step 1036. In step 1036, the interface manager 114 and/or other logic, software, and/or service can perform a timeout test, using a predetermined time period, to avoid an endless loop condition while attempting to detect a user selection of a desired symbolic element. If any timeout period has not expired, processing can return or loop back to step 1024. If a timeout period has expired, processing can return to 1014, and/or other processing point. If the determination of step 1024 is yes, processing can proceed to 1026, in which the selected character and/or other symbolic element can optionally be highlighted and/or otherwise altered in appearance.

In step 1028, the interface manager 114 and/or other logic, software, and/or service can make a determination made whether the user selection or touch down is at an extreme of the selection area 122, such as, for example, at the very beginning or very end of the selection area 122. If the determination in step 1028 is yes, processing can proceed to step 1030.

In step 1030 (FIG. 10C), the interface manager 114 and/or other logic, software, and/or service can cause a slow scroll mode or state to be entered. In various implementations, in the slow scroll mode or state, individual symbolic elements can in general be displayed at a reduced rate one after the other, creating a slow-scrolling effect, to assist the user in viewing and selecting a symbolic element at or beyond the extreme ends of the target range 128 determined by an earlier touch on the seek area 120. In implementations, the slow scroll mode or state can stop at the end of a character set displayed in the selection area 122, such as at the letters "a" or "z" when the set of symbolic elements 148 includes the English alphabet. In further implementations, the slow scroll mode or state can restart at a new position in the set of symbolic elements 148, such as by repositioning from the letter "z" to the letter "a," or from the letter "a" to the letter "z." Other sequences can be used in restarting or resetting the display in the slow scroll mode or state.

If the determination in step 1028 is no, processing can proceed to step 1032. In step 1032, the interface manager 114 and/or other logic, software, and/or service can make a determination whether a user selection and/or other input using a lift-off of a finger or pointing instrument (which may be referred to as a "touch up") on the currently displayed symbolic element has been received. If the determination of step 1032 is no, processing can return to step 1026. Thus, a user can slide a finger in the selection area 122, without releasing the touch contact, and receive feedback regarding one highlighted character or access a slow scroll mode to see additional characters that were not originally in the selection area 122 at the time when the target range 128 was determined.

When the desired letter is highlighted, the user may release the touch contact. If the determination of step 1032 is yes, processing can proceed to step 1034, in which the letter and/or other symbolic element located at the touch up point and/or other selection point can be selected for input. After step 1034, processing can proceed to step 1038.

In step 1038, the interface manager 114 can insert, input, and/or add the selected letter and/or other symbolic element identified in the selection area 122 in the text editing box 118 and/or other dialogue. In step 1040, the interface manager 114 and/or other logic, software, and/or service can optionally minimize, retract, and/or dissolve the selection area 122 after the symbolic element is inserted, as appropriate. For example, the selection area 122 can fade and the seek area 120 can restore to a center point and/or other default point.

In step 1042, the interface manager 114 and/or other logic, software, and/or service can make a determination whether the user has inputted or selected the done 144 or cancel button 146, and/or supplied other input indication completion of the symbol input process. If the determination of step 1042 is no, processing can return to step 1016, including the detection of user input indicating a new target range 128. If the determination of step 1042 is yes, processing can proceed to step 1044, in which the completed and/or composed text string and/or other input can be returned back to the calling application. For example, entry or acceptance into the text editing box 118, for example by selecting the "done" virtual button 144, can insert the text, message, symbolic elements, and/or other data into a data object(s) associated with the application (s) and/or services the user is operating on the electronic device 102. In step 1046, processing can repeat, return to a prior processing point, jump to a further processing point, or end.

It will be appreciated that while various processing activity, logical decisions, and/or other operations illustrated in FIGS. 10A-10C or elsewhere have been described as taking place in steps, that two or more of various of those operations or activities can be combined into one operation or activity, and that any one or more of those operations or activities can be divided into two or more operations or activities. Moreover, while those various operations or activities have been illustrated and described as occurring in a certain order, it will be appreciated that in implementations, those same and/or other operations or activities can take place in a different order or orders. It will likewise be understood that indicated reference numbers in connection with the various illustrated steps are intended for reference only, and are not meant to necessarily imply dependencies, precedence, and/or orders between steps, or that steps can not be rearranged or reordered. Further, while various operations or activities have been described as being carried out by certain hardware, software, service, and/or other resources, it will be appreciated that in implementations, the same activities and/or operations can be carried out by other hardware, software, service, and/or other resources, and/or combinations of the same.

It will likewise be appreciated that the foregoing description is illustrative, and variations in configuration and implementation may occur to persons skilled in the art. For example, while embodiments have been described that incorporate a two-stage character input interface 116, in implementations, three or more input stages can be used. Similarly, while implementations have been described in which the electronic device 102 can be or include a portable wireless communications device, in implementations, the operative device can be or include other types or classes of devices or hardware, such as, for example, a data device or hardware incorporated in an automobile having a dashboard or other display screen or area. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
providing, by an electronic device and for display in a seek area of a touch-sensitive display, a subset from a full range of a set of symbolic elements, wherein the subset has fewer symbolic elements than the full range;
receiving, by the electronic device and in the seek area of the touch-sensitive display, a first user input specifying a first target range of the set of symbolic elements, wherein the first target range comprises a first alphabetized range between at least two symbolic elements of the subset that are presented in the seek area of the touch-sensitive display, and wherein the first target range includes the at least two symbolic elements;
based on the first user input, providing, by the electronic device and for display in a selection area of the touch-sensitive display that is distinct from the seek area, individual symbolic elements from the first target range, wherein the individual symbolic elements from the first target range include the at least two symbolic elements of the first target range that are presented in the seek area of the touch-sensitive display, wherein the individual symbolic elements from the first target range further include at least one symbolic element of the first target range that is not included in the subset presented in the seek area of the touch-sensitive display, and wherein symbolic elements presented in the selection area are larger in size than symbolic elements presented in the seek area;
receiving, by the electronic device, a second user input specifying a second target range of the set of symbolic elements that is different from the first target range, wherein the second target range comprises a second alphabetized range of the subset that is presented in the seek area of the touch-sensitive display;
responsive to receiving the second user input:
removing, by the electronic device and from the selection area of the touch-sensitive display, at least one of the individual symbolic elements from the first target range; and
providing, by the electronic device and for display in the selection area of the touch-sensitive display, individual symbolic elements from the second target range, wherein the individual symbolic elements from the second target range include at least one symbolic element of the second target range that is not included in the subset presented in the seek area, and wherein the second target range includes at least one symbolic element that is also included in the first target range;

receiving, by the electronic device and in the selection area of the touch-sensitive display, a third user input indicating a selected symbolic element from the individual symbolic elements from the second target range; and based on the third user input, inserting, by the electronic device, the selected symbolic element in a data object.

2. The method of claim 1, wherein providing the subset from the full range of the set of symbolic elements in the seek area comprises:

providing at least one of alphabetic information, numeric information, or symbolic information.

3. The method of claim 1, wherein providing the subset from the full range of the set of symbolic elements presented in the seek area comprises:

providing a two-dimensional representation of the subset from the full range of the set of symbolic elements.

4. The method of claim 1, wherein providing the subset from the full range of the set of symbolic elements in the seek area comprises:

providing variably-separated symbolic elements in an ordered arrangement.

5. The method of claim 1, wherein inserting the selected symbolic element in the data object comprises transmitting the selected symbolic element to at least one of:

a messaging application or service, a telephony application or service, a search application or service, a word processing application or service, or a web-based application or service.

6. The method of claim 1, further comprising:
automatically generating the selected symbolic element in a training sequence.

7. The method of claim 1, further comprising:
providing, for display at the touch-sensitive display, a text editing box to show the selected symbolic element.

8. The method of claim 7, further comprising:
providing at least one of a done button or a cancel button in the text editing box to control entry of contents of the text editing box to a software application.

9. The method of claim 8, further comprising:
alternating a display of
the selected symbolic element, and
the done button or the cancel button,
in a same area of the touch-sensitive display.

10. The method of claim 1, further comprising:
providing, for display at the touch-sensitive display, a set of control buttons to control input operations of the set of symbolic elements.

11. The method of claim 10, further comprising:
alternating a display of
the selection area, and
the set of control buttons,
in a same area of the touch-sensitive display.

12. The method of claim 1, further comprising:
before receiving the third user input in the selection area indicating the selected symbolic element, receiving a fourth user input in the selection area at an extreme location of the selection area; and
adding a new individual symbolic element to the selection area and removing, from the selection area, an old individual symbolic element from the second target range based on the fourth user input.

13. The method of claim 12, wherein the fourth user input is located at a right extreme of the selection area, and the new individual symbolic element is a character after a last symbolic element in the second target range and the old individual symbolic element is a first symbolic element in the second target range.

14. The method of claim 12, wherein the fourth user input is located at a left extreme of the selection area, and the new individual symbolic element is a character before a first symbolic element in the second target range and the old individual symbolic element is a last symbolic element in the second target range.

15. A device, comprising:
a touch-sensitive display; and
a processor, coupled to the touch-sensitive display, the processor being configured to:

provide, for display in a seek area of the touch-sensitive display, a subset from a full range of a set of symbolic elements, wherein the subset has fewer symbolic elements than the full range;

receive, in the seek area of the touch-sensitive display, a first user input specifying a first target range of the set of symbolic elements, wherein the first target range comprises a first alphabetized range between at least two symbolic elements of the subset that are presented in the seek area of the touch-sensitive display, and wherein the first target range includes the at least two symbolic elements;

based on the first user input, provide, for display in a selection area of the touch-sensitive display that is distinct from the seek area, individual symbolic elements from the first target range that include the at least two symbolic elements of the first target range that are presented in the seek area of the touch-sensitive display, wherein the individual symbolic elements from the first target range further include at least one symbolic element of the first target range that is not included in the subset presented in the seek area of the touch-sensitive display, and wherein symbolic elements presented in the selection area are larger in size than symbolic elements presented in the seek area;

receive a second user input specifying a second target range of the set of symbolic elements that is different from the first target range, wherein the second target range comprises a second alphabetized range of the subset that is presented in the seek area of the touch-sensitive display;

responsive to receiving the second user input:
remove, from the selection area of the touch-sensitive display, at least one of the individual symbolic elements from the first target range; and provide, for display in the selection area of the touch-sensitive display, individual symbolic elements from the second target range, wherein the individual symbolic elements from the second target range include at least one symbolic element of the second target range that is not included in the subset presented in the seek area, and wherein the second target range includes at least one symbolic element that is also included in the first target range;

receive, in the selection area of the touch-sensitive display, a third user input indicating a selected symbolic element from the individual symbolic elements from the second target range; and based on the third user input, insert the selected symbolic element in a data object.

16. The device of claim 15, wherein the touch-sensitive display is configured to show at least one of alphabetic information, numeric information, or symbolic information in at least one of the seek area or the selection area.

17. The device of claim 15, wherein
at least one of receiving the first user input, the second user input, or the third user input comprises:
receiving a touch-based input on the touch-sensitive display.

18. The device of claim 15, further comprising at least one of a done button or a cancel button to control entry of the selected symbolic element in the data object.

19. The method of claim 1, wherein receiving the second user input specifying the second target range of the set of symbolic elements comprises receiving the second user input in the seek area.

20. The method of claim 1, wherein receiving the second user input specifying the second target range of the set of symbolic elements comprises receiving the second user input in the selection area.

21. The method of claim 1,
wherein the first target range and the second target range share at least one common symbolic element,
wherein the at least one of the individual symbolic elements from the first target range that is removed from the selection area is different from the at least one common symbolic element, and
wherein providing, in the selection area, the individual symbolic elements from the second target range comprises adding, in the selection area, at least one new symbolic element from the second target range, the at least one new symbolic element being different from the at least one common symbolic element.

* * * * *